United States Patent [19]

Hsiao

[11] Patent Number: 5,427,403
[45] Date of Patent: Jun. 27, 1995

[54] KNOCKDOWN GOLF CART WITH REDUCED VOLUME

[76] Inventor: Fang-jung Hsiao, 380-8, Hsinchuotze, Lung-Chiang Li, Pu Tai, Chiayi Hsien, Taiwan

[21] Appl. No.: 189,688

[22] Filed: Feb. 1, 1994

[51] Int. Cl.6 ............................................. B62B 1/12
[52] U.S. Cl. .............................. 280/646; 280/DIG. 6; 280/652; 280/655
[58] Field of Search ............ 280/646, 652, 655, 47.26, 280/DIG. 6

[56] References Cited

U.S. PATENT DOCUMENTS

| | | | |
|---|---|---|---|
| 2,415,392 | 11/1944 | Morehouse | 280/646 |
| 4,522,299 | 6/1985 | Clark et al. | 280/DIG. 6 |
| 4,714,268 | 3/1987 | Mather et al. | 280/646 |
| 4,887,835 | 12/1989 | Dallaire et al. | 280/655 |
| 5,180,087 | 1/1993 | Lee | 280/DIG. 6 |
| 5,201,540 | 4/1993 | Wu | 280/646 |

FOREIGN PATENT DOCUMENTS 143207 10/1990 Taiwan .
153932 3/1991 Taiwan .

Primary Examiner—Brian L. Johnson
Assistant Examiner—Min Yu
Attorney, Agent, or Firm—Browdy and Neimark

[57] ABSTRACT

A knockdown golf cart with reduced volume composed of a tube frame assembly, an upper and a lower bracket assemblies, a handle assembly, a wheel support assembly, an L-shaped beam member and a bracket board. The tube frame assembly includes two circular tubes which are formed with inner slide grooves and connected to each other by a fixing ring member. A folding link is connected to a folding link seat disposed under the fixing ring member. The upper and lower brackets are disposed at an upper and a lower ends of the tube frame assembly. The handle assembly includes a slide block slidably fitted in the slide grooves of the circular tubes. The wheel support assembly is secured to the fixing ring member of the tube frame assembly and pivotally connected with the folding links thereof. The L-shaped beam member has a rectangular end fitted with the lower bracket and a flat end fitted with the bracket board.

7 Claims, 9 Drawing Sheets

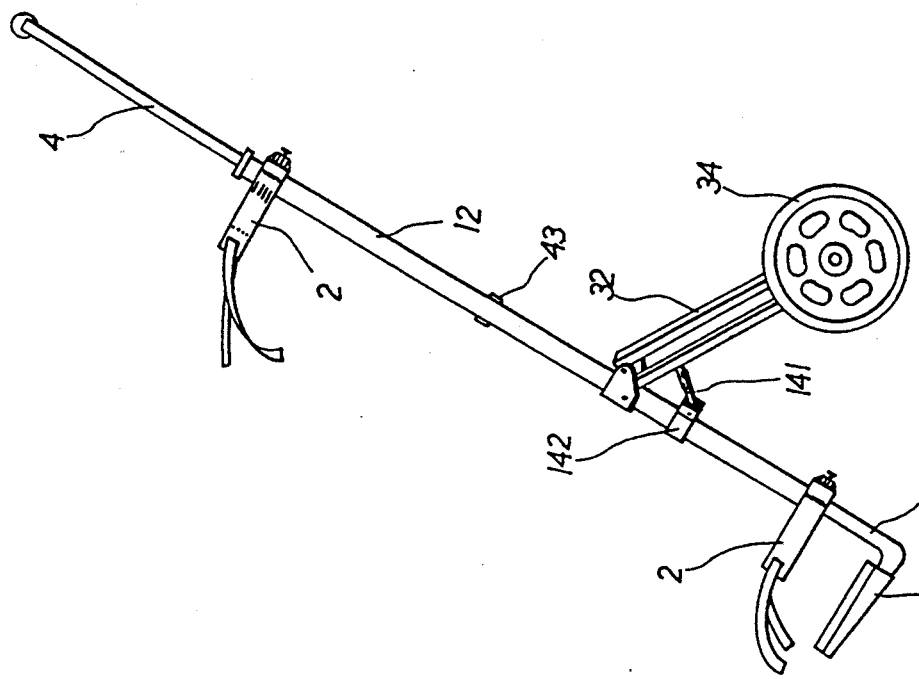
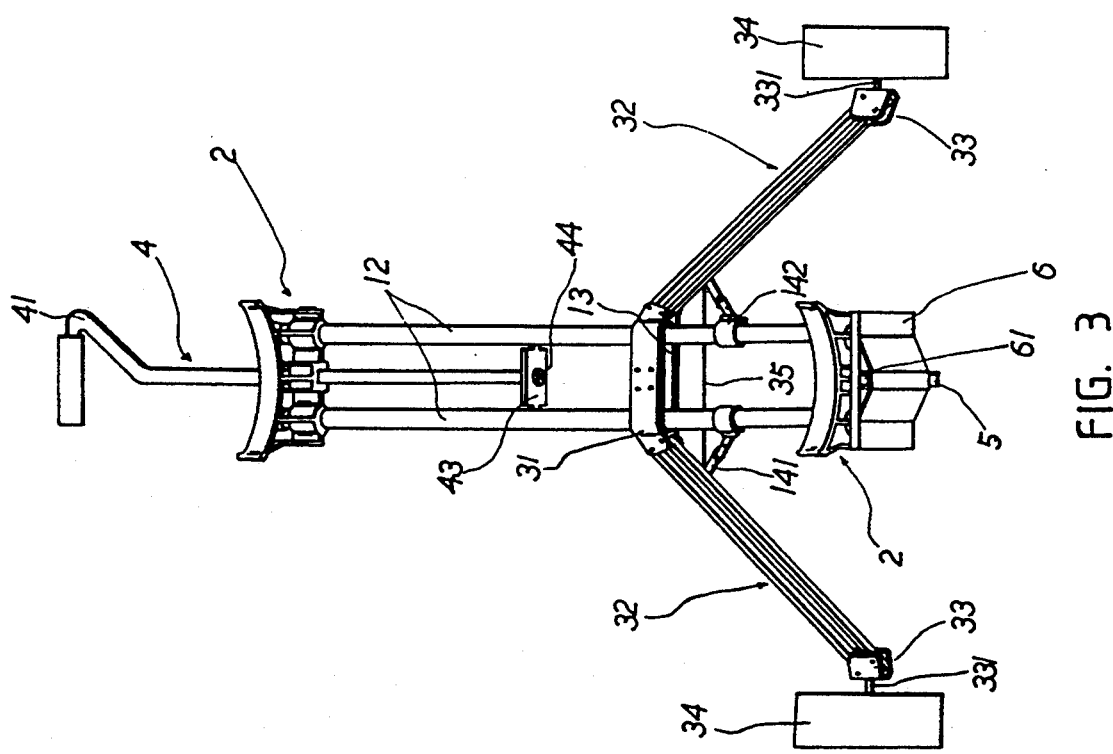

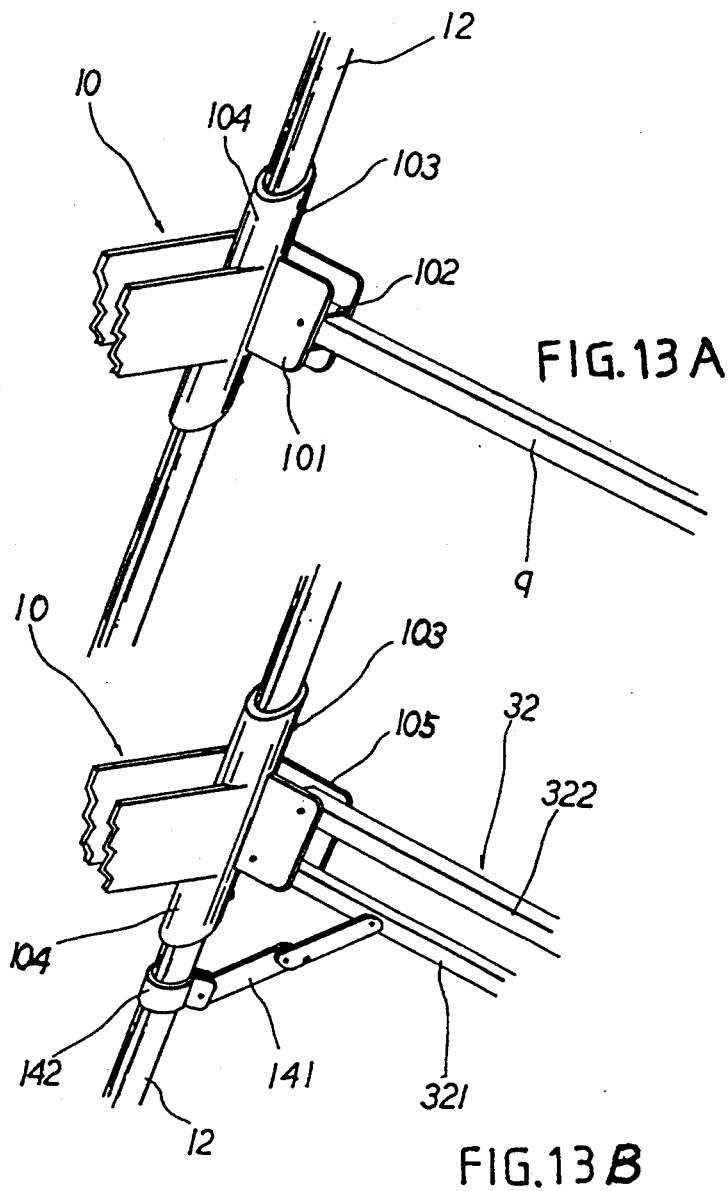
FIG. 13A
FIG. 13B
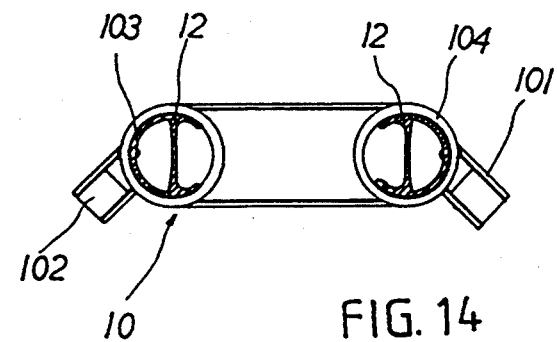
FIG. 14

KNOCKDOWN GOLF CART WITH REDUCED VOLUME

BACKGROUND OF THE INVENTION

The present invention relates to a knockdown golf cart with reduced volume, and more particularly to a knockdown golf cart which can be easily quickly assembled and disassembled by tightening and untightening screws and can be packed in a pattern with greatly reduced volume so that the transferring efficiency thereof is increased and the transferring cost is lowered.

A conventional two-stage foldable golf cart is shown in Taiwan ref 153932, 3/11/91. Such golf cart has a support frame composed of two sections which can be 180 degrees folded. When folding the support frame, by means of links, the wheels are simultaneously inward retracted so as to minify the volume for easy carriage. Although the above golf cart can be folded to reduce the volume, the room occupied by the folded golf cart is still too much. Therefore, an improved three-stage foldable golf cart is developed as shown in Taiwan ref 143207, 10/1/90. In such golf cart, a 180 degrees foldable joint is disposed near the wheel support and the handle assembly is telescopic (or foldable). The wheels are retracted in a similar manner. Therefore, the volume of such golf cart can be even more reduced so as to greatly facilitate the carriage thereof. However, the cost and price of the such golf cart are high by the following reasons:

1. For achieving the folding function, many additional parts are necessary; and
2. The manufacturing cost of the golf cart is increased due to the additional parts and the assembling procedure becomes more complicated and thus the production efficiency and speed are lowered.

Therefore, it is necessary to provide an improved knockdown and foldable golf cart to eliminate the above shortcomings existing in the conventional golf carts. composed of simple components which can be easily quickly assembled and disassembled by tightening and untightening screws and can be packed in a pattern with greatly reduced volume so that the transferring ability can be enhanced and the manufacturing cost is lowered. Moreover, the golf cart of the present invention permits a user to easily assemble the golf cart by himself.

SUMMARY OF THE INVENTION

It is a primary object of the present invention to provide a knockdown golf cart composed of simple components which can be easily quickly assembled and disassembled by tightening and untightening screws and can be packed in a pattern with greatly reduced volume so that the transferring ability can be enhanced and the manufacturing cost is lowered. Moreover, the golf cart of the present invention permits a user to easily assemble the golf cart by himself.

The present invention can be best understood through the following description and accompanying drawing, wherein:

BRIEF DESCRIPTION OF THE DRAWINGS

FIG. 3 is a front view according to FIG. 2;

FIG. 4 is a side view according to FIG. 2;

FIG. 13A shows the structure of a third embodiment of the wheel support assembly of the present invention; and FIG. 13B shows the structure of a fourth embodiment of the wheel support assembly of the present invention;

FIG. 14 is a top view according to FIG. 13.

DETAILED DESCRIPTION OF THE PREFERRED EMBODIMENTS

Figure 1:
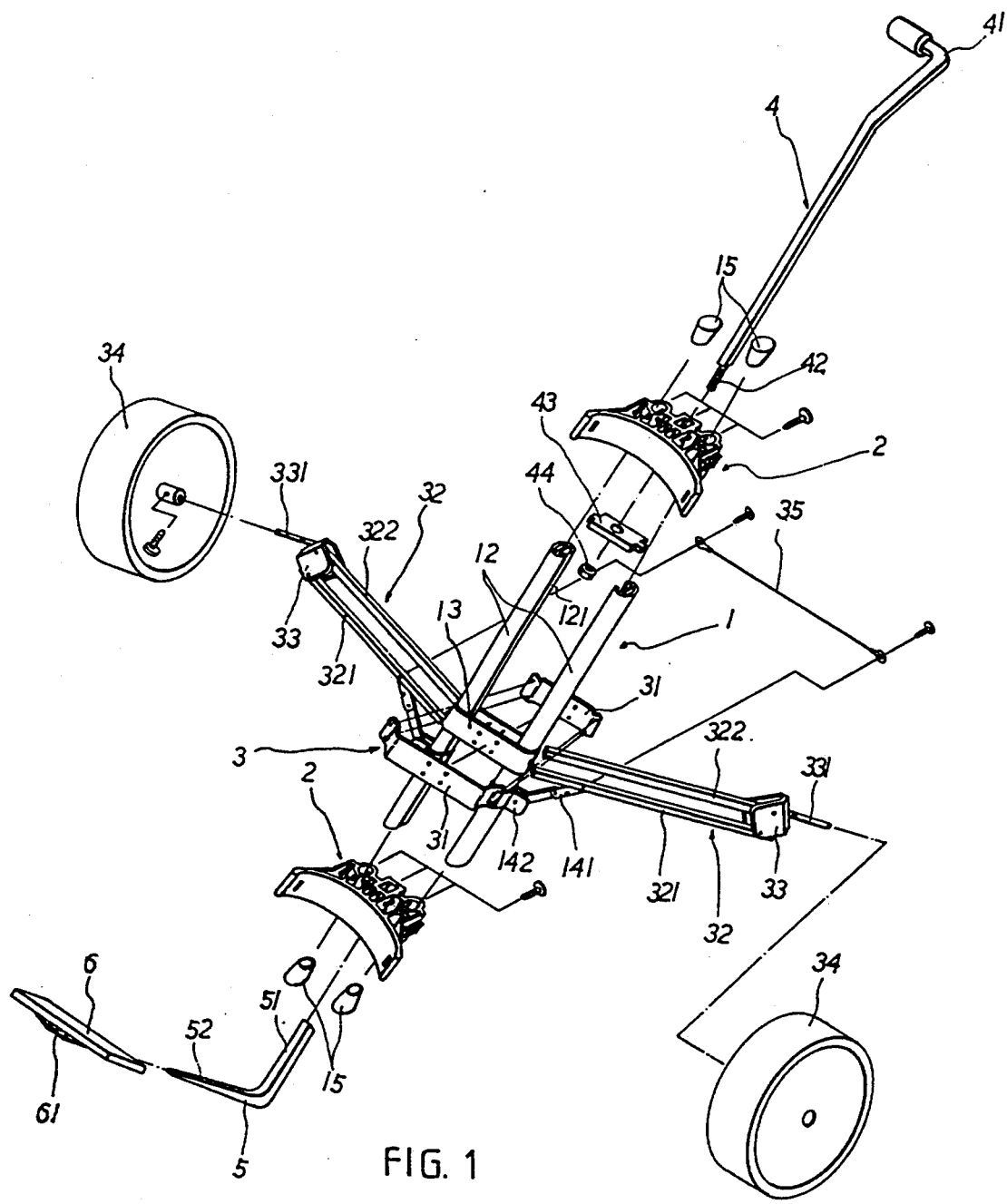
FIG. 1 is a perspective exploded view of the present invention.
Figure 2:
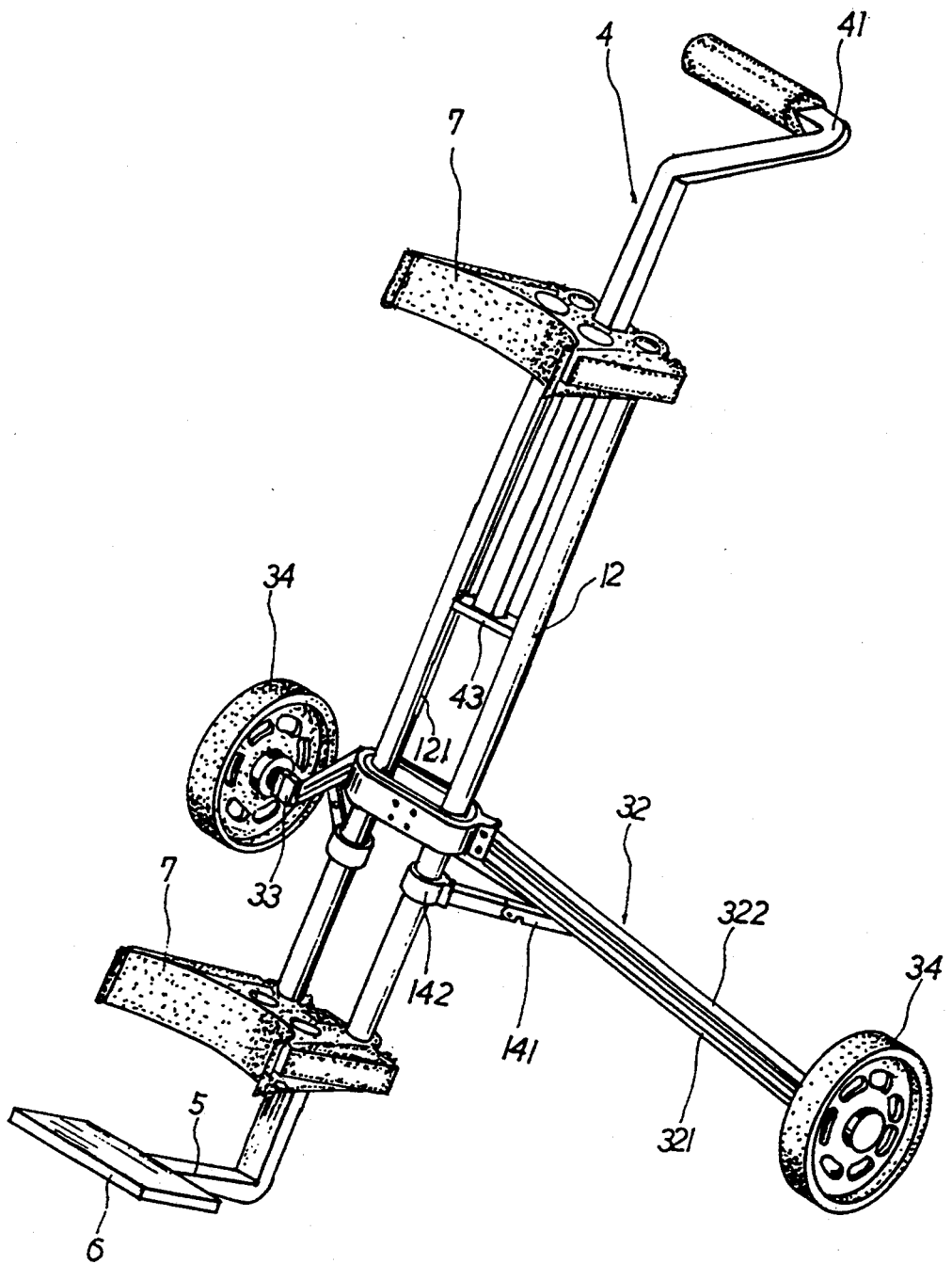
FIG. 2 is a perspective assembled view of the present invention.
Figure 5B:
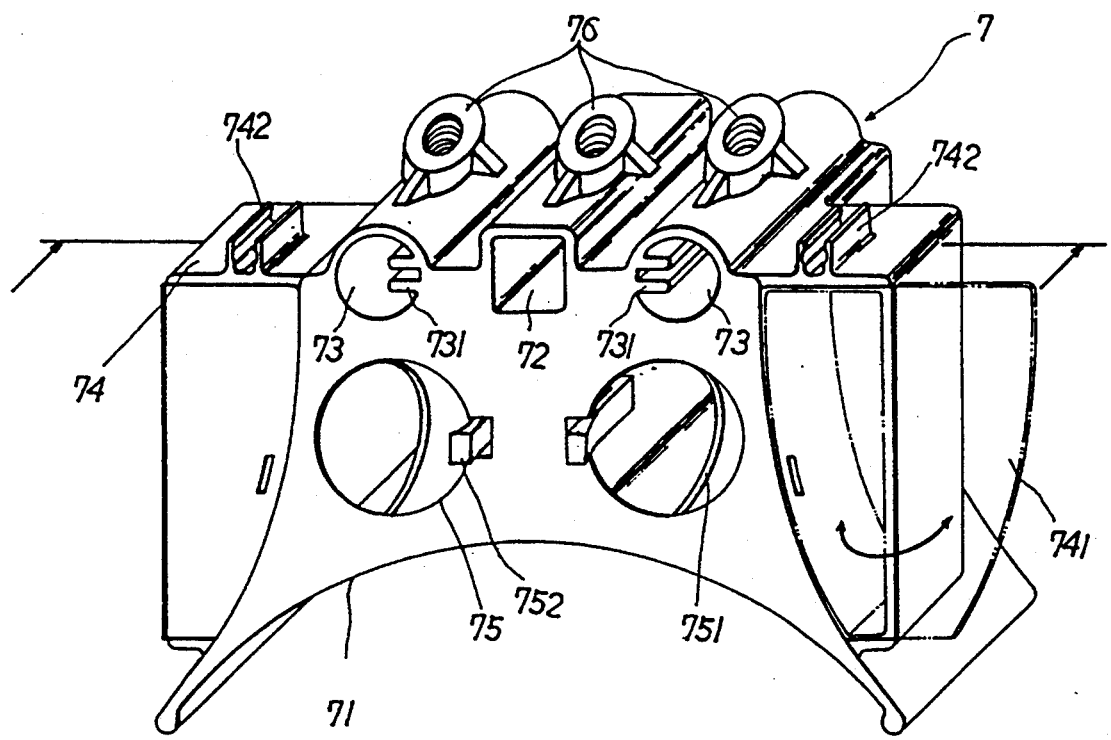
FIG. 5B shows a perspective view of a first embodiment of the bracket of the present invention.
Figure 5A:
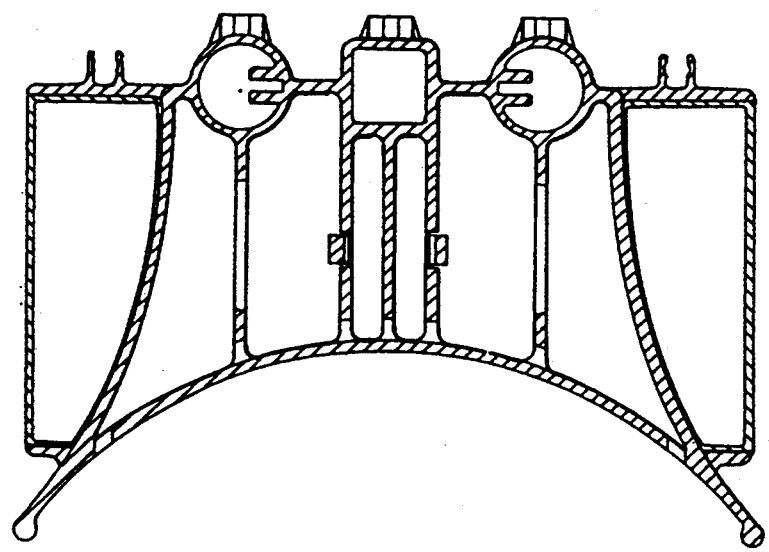
FIG. 5A shows a sectional view of a first embodiment of the bracket of the present invention.
Figure 7:
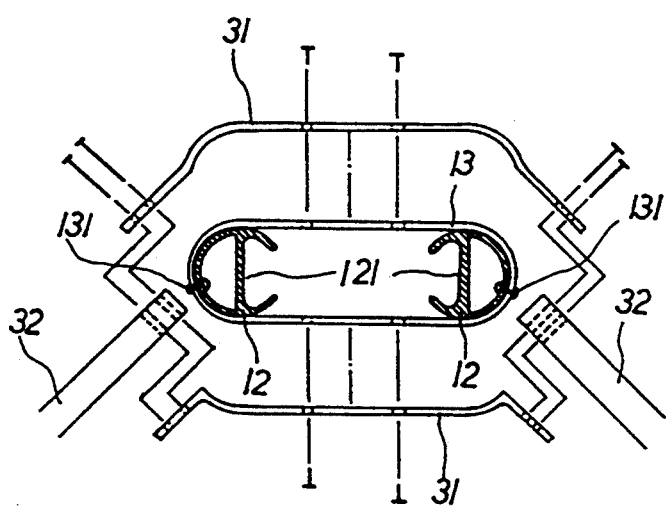
FIG. 7 illustrates the fixing of a first embodiment of the wheel support assembly of the present invention.
Figure 8:
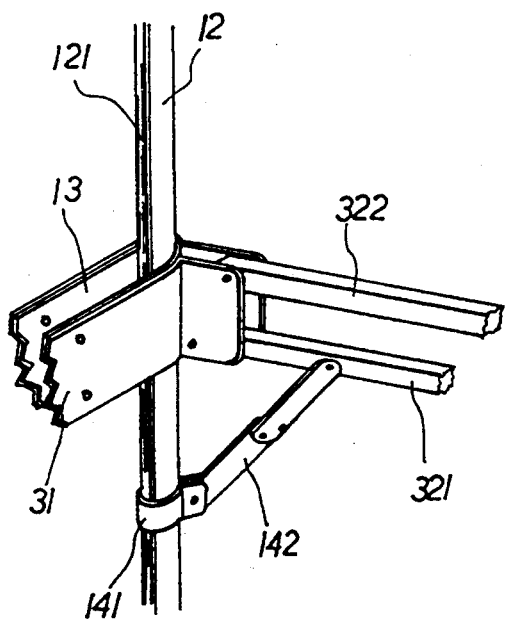
FIG. 8 shows the connection between the wheel support assembly and the folding links of the present invention.
Figure 9:
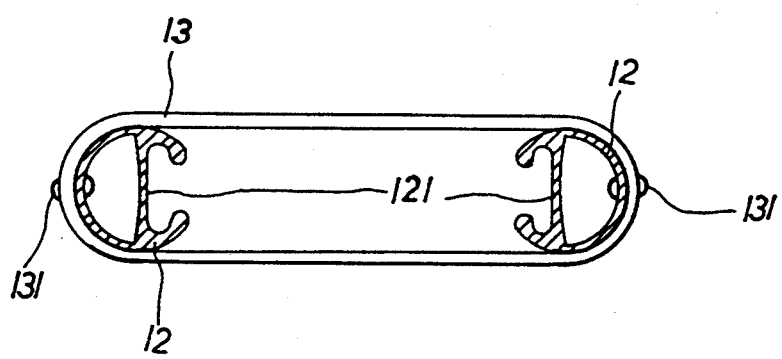
FIG. 9 is a sectional view of the fixing ring member of the tube frame assembly of the present invention.

Please refer to FIGS. 1 to 4. The present invention includes tube frame assembly 1, an upper and a lower bracket 7, a handle assembly 4, a wheel support assembly 3, an L-shaped beam member 5 and a bracket board 6, wherein:

the tube frame assembly 1 includes two circular tubes 12 which are formed with inner opposite slide grooves 121 and connected to each other by a fixing ring member 13, a folding link 141 being connected to a folding link seat 142 disposed under the fixing ring member 13 (FIGS. 7, 8 and 9);

the upper and lower brackets 7 are made by integral injection molding, having a front arch supporting face 71, a rear middle rectangular column 72 formed with an inner rectangular hole, two rear lateral cylindric columns 73 formed with inner circular holes and tube-fixing ribs 731, the three columns being connected to one another by connecting plates, three thread holes 76 being formed behind the three columns, two triangular article boxes 74 with box covers 741 being disposed on two sides of the brackets 7, each article box 74 being formed-with rear clip members 742 for holding a tee, an upper surface of each bracket being formed with two circular holes 75 and a connecting plate located under the upper surface being formed with corresponding arch recess 751 and clamping claw 752 for holding a golf ball in the circular hole 75 (FIGS. 5A and 5B);

the handle assembly 4 is composed of an upper bent stem 41, a lower thread rod 42 and a slide block 43 slidably fitted on the stem 41;

the wheel support assembly 3 includes a pair of support seat members 31 associated with each other, and two pairs of upper and lower links 32 pivotally connected to two ends of the support seat members 31, each wheel seat 33 having a wheel shaft 331 connected with a wheel 34, the folding link 141 of the tube frame 1 being pivotally connected to the lower links 321 of the wheel support assembly 3 and a rope 35 being connected between two pivot joints of the folding links 141, whereby the folding links 141 and the ropes 35 firmly support the wheel support assembly 3 in a stretched state and when folded, the folding links 141 are folded to inward retract the wheel support assembly 3, and according to the principle of parallelogram, the wheels of the wheel support assembly 3 will contact the ground in a perpendicular direction no matter at what angle the wheel support assembly 3 is disposed (FIGS. 7 and 8);

the L-shaped beam member 5 has a rectangular end 51 and a flat end 52; and the bracket board 6 is a plane board having an insert hole 61.

When assembled, the slide block 43 is first fitted between the two circular tubes 12 of the tube frame assembly 1 along the inner slide grooves 121 thereof. Then, the upper bracket 7 is fitted between the two circular tubes 12 with the tube-fixing ribs 731 of the lateral circular holes 73 of the upper bracket 7 inserted in the inner slide grooves 121 of the circular tubes 12. Thereafter, screws being screwed into the thread holes 76 of the upper bracket 7 to fix the same on the circular tubes 12. Two plug members 15 are fitted into two ends of the circular tubes 12. Then, the handle 4 is extended through the rectangular hole 72 of the upper bracket 7 and the thread rod 42 of the handle 4 is secured with the slide block 43. After the handle 4 is adjusted to a suitable length, a screw is screwed into the thread hole 76 behind the rectangular hole 72 of the upper bracket 7 to fix the handle 1 in the upper bracket 7. Then, the wheel support seats 31 are associated by screws to clamp the fixing ring member 13 of the tube frame assembly 1. Also, the two pairs of upper and lower links 32 of the wheel support assembly 3 are pivotally connected to the wheel support seats 31. Then, the wheels 34 are fitted onto the wheel shafts 331 of the wheel seats 33 and secured thereon by screws. Upper ends of the folding links 141 are connected to the lower links 321 of the wheel support assembly 3 by screws and then the lower bracket 7 is fitted onto lower ends of the two circular tubes 12 and secured thereon by means of screwing screws through the thread holes 76 of the lower bracket 7. The L-shaped beam member 5 is inserted into the rectangular hole 72 of the lower bracket 7 and secured therein by a screw. Finally, the flat end 52 of the L-shaped beam member 5 is fitted into the insert hole 61 of the bracket board 6 and the assembling procedure of the golf cart is completed. When folding the golf cart, the screw which fixes the handle 4 is untightened and the handle 4 is pushed inward. Then, the folding links 141 are folded to inward retract the wheel support assembly 3.

Figure 6:
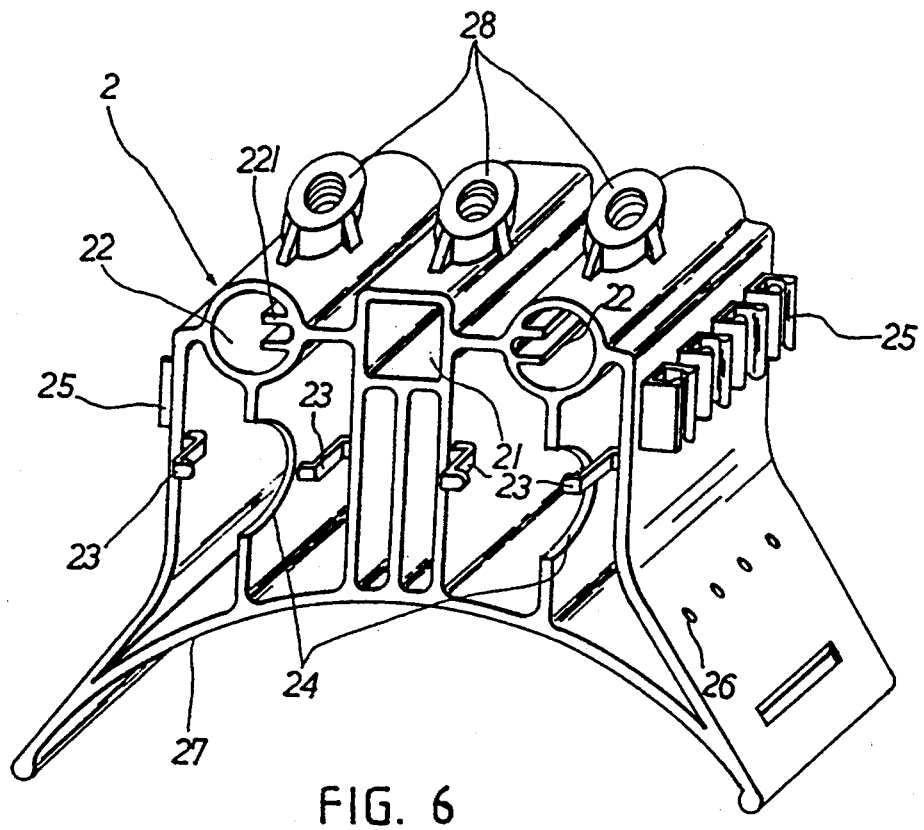
FIG. 6 shows a perspective view of a second embodiment of the bracket of the present invention.

FIG. 6 shows another embodiment of the upper and lower brackets, wherein the upper and lower brackets 2 are made by integral injection molding, having a front arch supporting face 27, a rear middle rectangular column 21 formed with an inner rectangular hole, two rear lateral cylindric columns 22 formed with inner circular holes and tube-fixing ribs 231, the three columns being connected to one another by connecting plates, three thread holes 28 being formed behind the three columns, multiple clip members 25 being formed on two lateral sides of the brackets 2 for holding a tee, two lateral inclined surface of each bracket being formed with multiple small circular holes 26 in which multiple mark pins are inserted. A connecting plate located under an upper surface of the bracket 2 is formed with arch recess 24 and lateral clamping claw 23 for holding a golf ball therein (FIG. 6).

Figure 10:
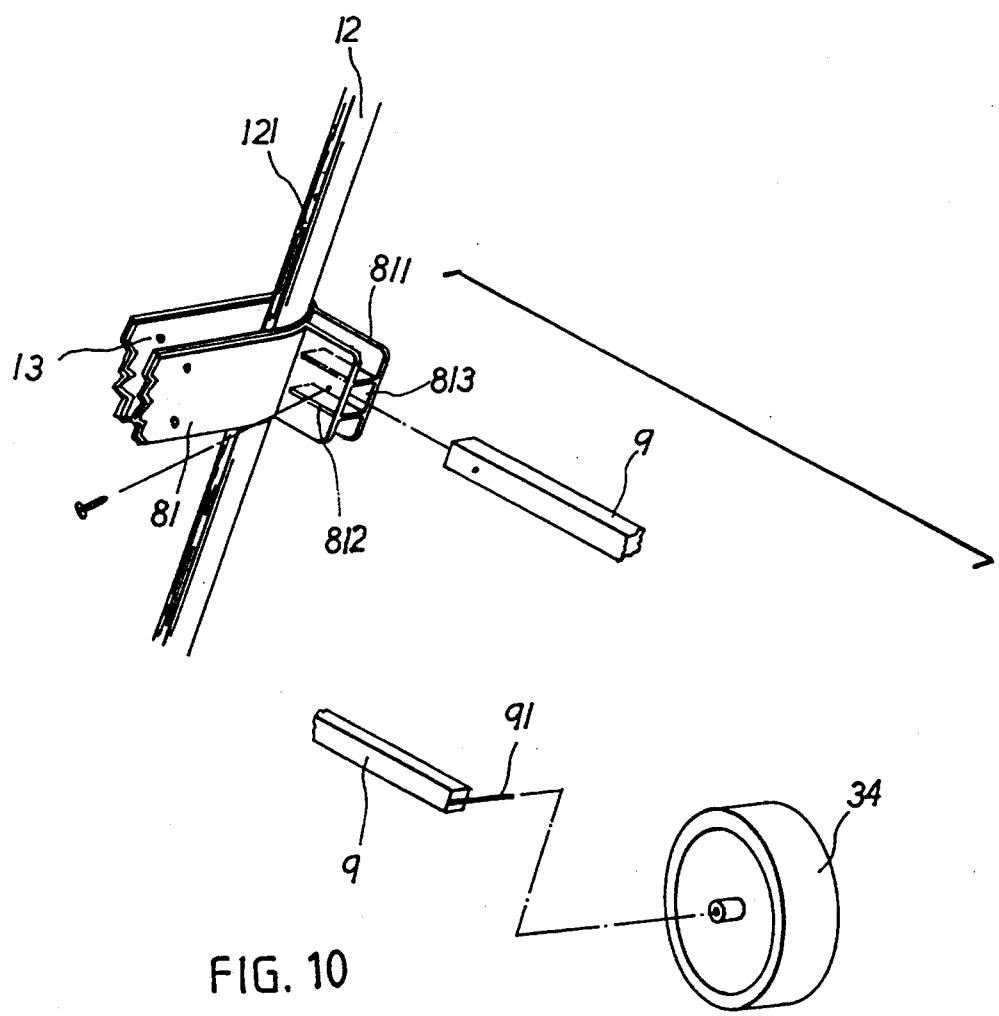
FIG. 10 shows a second embodiment of the wheel support assembly of the present invention.

FIG. 10 shows another embodiment of the wheel support assembly, wherein the wheel support assembly 8 includes an integrally made wheel support seat 81, two lateral butterfly-like plates 811, two fixing ribs 812 located between the butterfly-like plates 811, defining a rectangular hole 813, and a rectangular rod 9 inserted in the rectangular hole 813 and secured therein by a screw. The rectangular rod 9 has a wheel shaft 91 at one end for connecting with a wheel 34. A rope is connected between two rectangular rods 9 for more securely using the wheel support assembly 8. When assembled, the wheel support assembly 8 must be fitted onto the two circular tubes 12 from the lower ends thereof before installing the lower bracket 7. Then, the wheel support assembly 8 is secured on the fixing ring member 13. In this arrangement, no folding links 141 is needed and when disassembled, the screw is untightened from the butterfly-like plates 811 for detaching the rectangular rod 9 therefrom.

FIGS. 13 and 14 show another embodiment of the wheel support assembly, wherein the wheel support assembly 10 is integrally made, including a sleeve section 104, two butterfly-like plates 101 connected thereto and two fixing ribs 102 disposed between the two butterfly-like plates 101, defining a rectangular hole. When assembled, the two circular tubes 12 is inserted through the sleeve sections 104 and secured therein by rivets 103. One end of the rectangular rod 9 connected with the wheel 34 is inserted into the rectangular hole to complete the installation of the wheel support assembly. Moreover, the mold for making the wheel support assembly can be varied to form a wheel support assembly having butterfly-like plates 105 without the inner fixing ribs and when assembled, two parallel upper and lower links 32 are connected with the butterfly-like plates 105 and the lower link 321 is pivotally connected with the folding link 141.

Figure 11A:
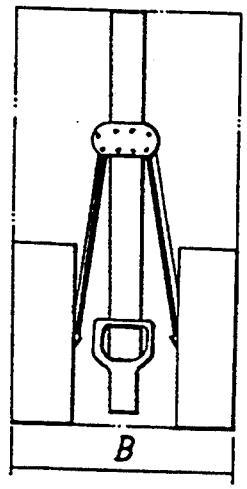
FIGS. 11A and 11B shows the packing of the conventional golf cart.
Figure 11B:
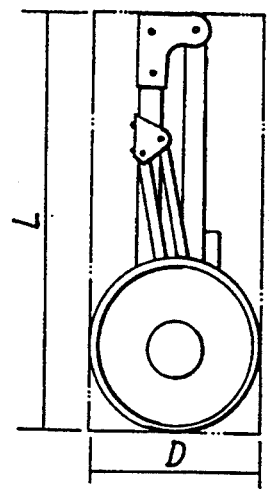
Figure 12A:
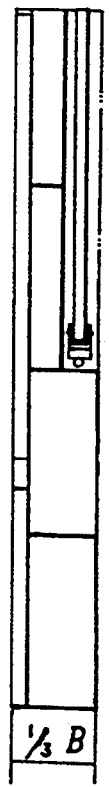
FIGS. 12A and 12B shows the packing of the golf cart of the present invention.
Figure 12B:
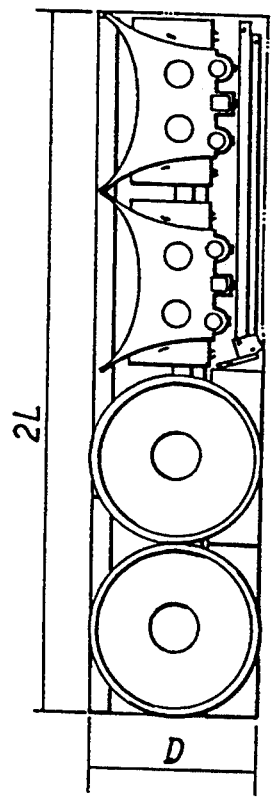

According to the above arrangements, the screw securing the upper bracket 7 can be loosened, permitting the upper bracket 7 to move up and down along the circular tubes 12 for meeting the requirement of the length of the golf bag and effectively holding the same. It should be noted that before assembled, the golf cart is divided into the tube frame assembly 1, upper and lower brackets 7, wheel support assembly 3, handle assembly 4, L-shaped beam member 5, bracket board 6, two wheels 34 and multiple screws. When packed, these components are arranged as shown in FIGS. 12A and 12B. Compared with the packing arrangement of a three-stage foldable golf cart as shown in FIGS. 11A and 11B, the volume thereof is B*D*L, while the volume of the golf cart of the present invention is 2L*D*3/1B=2/3B*D*L. Therefore, the volume of the conventional golf cart is ⅓ reduced. With respect to a container with the same volume, 1000 conventional three-stage foldable golf carts can be contained therein, while 1500 golf carts of the present invention can be contained in the same container. As a consequence, 1500 golf carts of the present invention can be contained in one container and transferred at one time, while 1500 conventional golf carts will have to be contained in two containers so that the cost will be double.

In conclusion, the golf cart of the present invention has less volume and the space occupied thereby is reduced so that the transferring cost is greatly lowered. Moreover, a user can assemble the present golf cart by himself to save the assembling cost. The assembling procedure can be easily and quickly done and the assembled golf cart can be folded to facilitate the carriage thereof.

It is to be understood that the above description and drawings are only used for illustrating one embodiment of the present invention, not intended to limit the scope thereof. Any variation and derivation from the above description and drawings should be included in the scope of the present invention.

What is claimed is:

1. A knockdown golf cart with reduced volume, comprising a tube frame, an upper and a lower bracket, a handle, a pair of wheels, wheel support means for engaging the pair of wheels to the tube frame, an L-shaped beam member and a bracket board, wherein:

said tube frame has two circular tubes which are formed with inner opposite slide grooves and connected to each other by a fixing ring member disposed around said two circular tubes, said upper and lower bracket are disposed at an upper and a lower end of said tube frame, each said bracket having a front arch supporting face, a rear middle rectangular column formed with an inner rectangular hole, two rear lateral cylindric columns formed with inner circular holes and tube-fixing ribs, said rear middle rectangular column and said two rear lateral cylindric columns being connected to one another by connecting plates, three thread holes being formed behind said three columns, an upper surface of each bracket being formed with two circular holes, a connecting plate engaged under said upper surface being formed with a corresponding arch recess and clamping claw for holding a golf ball in each said circular hole;

said handle is slidably fitted in the upper bracket rectangular hole and composed of an upper bent stem, a lower thread rod and a slide block slidably fitted on said stem;

said L-shaped beam member is fitted in the lower bracket rectangular hole and has a rectangular end and a flat end; and said bracket board is a plane board having an insert hole in which said flat end of said L-shaped beam member is inserted.

2. A golf cart as claimed in claim 1, wherein said upper and lower bracket are made by integral injection molding, and further comprise multiple clip members being formed on two lateral sides of said brackets for holding a tee, and two lateral inclined surfaces of each bracket being formed with multiple small circular holes in which multiple mark pins are inserted.

3. A golf cart as claimed in claim 1, wherein said upper and lower bracket further comprise two triangular article boxes with box covers being respectively disposed on two sides of each said upper and lower bracket, each article box being formed with rear clip members for holding a tee.

4. A golf cart as claimed in claim 1, wherein said wheel support means comprises:

a support seat member engaged to said tube frame;

a first end of each of two pairs of upper and lower links respectively pivotally connected to each end of said support seat member, each of a pair of wheel seats having a wheel shaft connected with the wheels;

a second end of each of said two pairs of upper and lower links respectively pivotally connected to each of said pair of wheel seats;

a folding link on said tube frame being pivotally connected to each lower link of said upper and lower links; and a rope being connected between each said folding link.

5. A golf cart as claimed in claim 1, wherein said wheel support means comprises:

an integrally made wheel support seat, two pair of parallel plates fixed to each end of said wheel support seat;

two fixing ribs located between each of said two pair of parallel plates defining a rectangular hole;

a rectangular rod inserted in each said rectangular hole and secured therein by a screw, each said rectangular rod having a wheel shaft at one end for respectively connecting with each of said wheels, a rope being connected between each said rectangular rod for securing use of said wheel support means, whereby when assembled, said wheel support seat is fitted onto said two circular tubes from lower ends thereof before installing said lower bracket.

6. A golf cart as claimed in claim 4, wherein, said wheel support seat is integrally made and is fitted onto said two circular tubes from lower ends thereof before installing said lower bracket.

7. A golf cart as claimed in claim 4, wherein said wheel support seat is made with a pair of support seat members engaged to each other around said tube frame.

* * * * *